May 19, 1925.

R. BRUTON 1,538,023

COTTON HARVESTER

Filed June 10, 1924     3 Sheets-Sheet 1

Inventor

R Bruton.

By Clarence A. O'Brien

Attorney

May 19, 1925.  
R. BRUTON  
COTTON HARVESTER  
Filed June 10, 1924   3 Sheets-Sheet 2
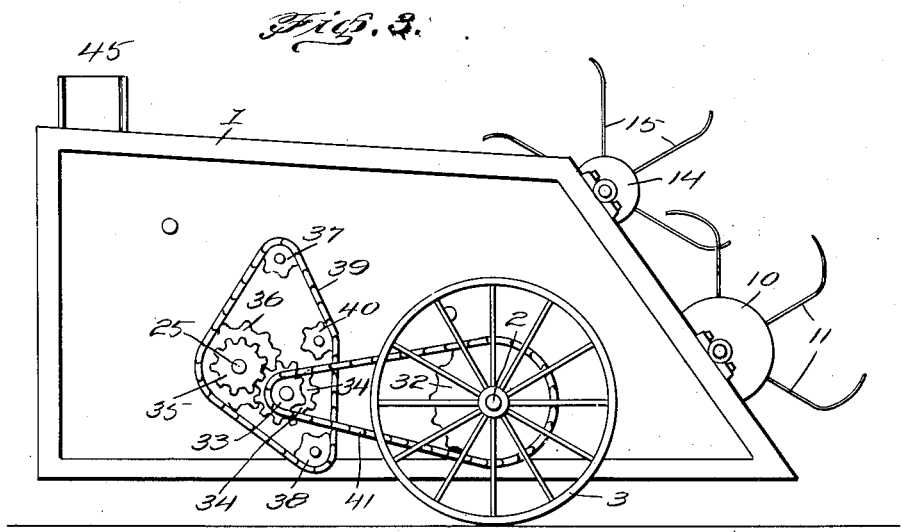
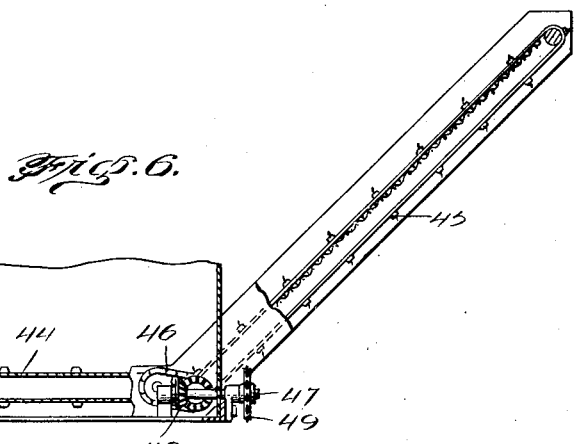
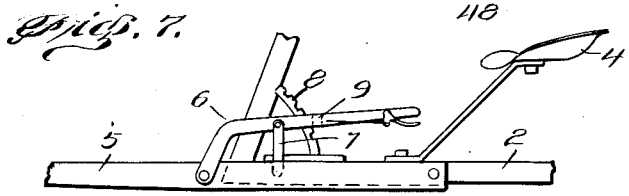
Inventor  
R. Bruton.  
By Clarence A. O'Brien  
Attorney May 19, 1925.  
R. BRUTON  
COTTON HARVESTER  
Filed June 10, 1924  
1,538,023  
3 Sheets-Sheet 3

Inventor  
R. Bruton.  
By Clarence A. O'Brien  
Attorney

Patented May 19, 1925.

1,538,023

UNITED STATES PATENT OFFICE.

ROBERT BRUTON, OF HALE CENTER, TEXAS.

COTTON HARVESTER.

Application filed June 10, 1924. Serial No. 719,169.

*To all whom it may concern:*

Be it known that I, ROBERT BRUTON, a citizen of the United States, residing at Hale Center, in the county of Hale and State of Texas, have invented certain new and useful Improvements in Cotton Harvesters, of which the following is a specification.

This invention relates to cotton harvesters and it consists in the novel features hereinafter described and claimed.

An object of the invention is to provide a harvester adapted to be moved along a row of standing plants, and including means for removing the cotton bolls from the plants, there being provided other means for brushing or sweeping the bolls from the said removing means, and for passing the bolls rearwardly toward a hull breaker, which is mounted upon the frame of the machine.

The several means hereinbefore mentioned are arranged to operate simultaneously, and are driven from the axle of the machine.

A further object of the invention is to provide in a machine of the character stated a series of saws, toward which the cotton fiber and the broken hulls are directed, the last mentioned means being adapted to effect a separation of the cotton fiber, and the loose particles of hulls and the said means are provided with features for removing from the fiber any of the particles of hulls, which may be adhering thereto, in order that the fiber may be delivered to a suitable conveying means with which the machine is equipped, and in condition for initial or local tagging or baling.

In the accompanying drawings:

Figure 3 is a side elevation of the cotton harvester, looking at that side thereof opposite the side which is illustrated in Figure 1.

Figure 6 is a transverse sectional view, through the rear portion of the cotton harvester, with parts broken away, parts removed, and parts shown in section.

Figure 7 is a side elevation of means provided upon the cotton harvester, for adjusting the tongue with relation to the frame of the machine.

Figure 1:
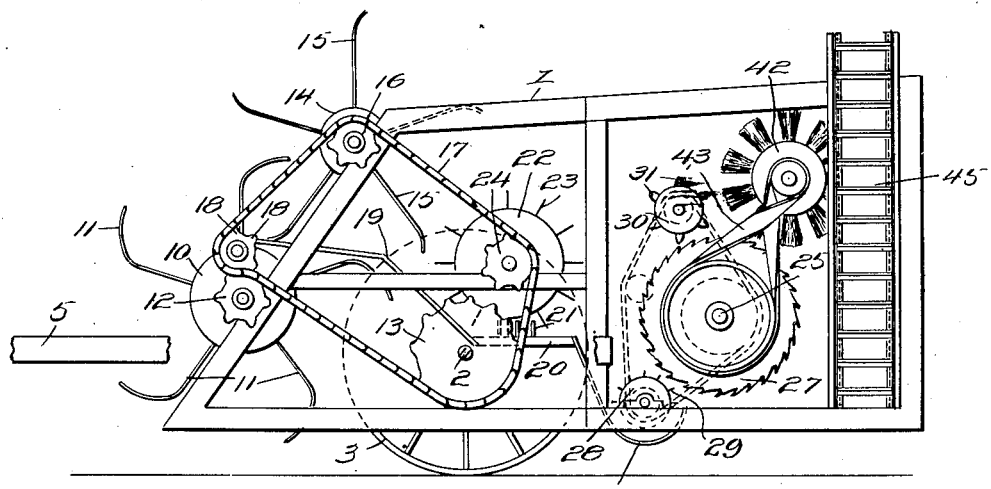
Figure 1 is a side elevation of the cotton harvester with parts removed, parts broken away, and parts shown in section.
Figure 2:
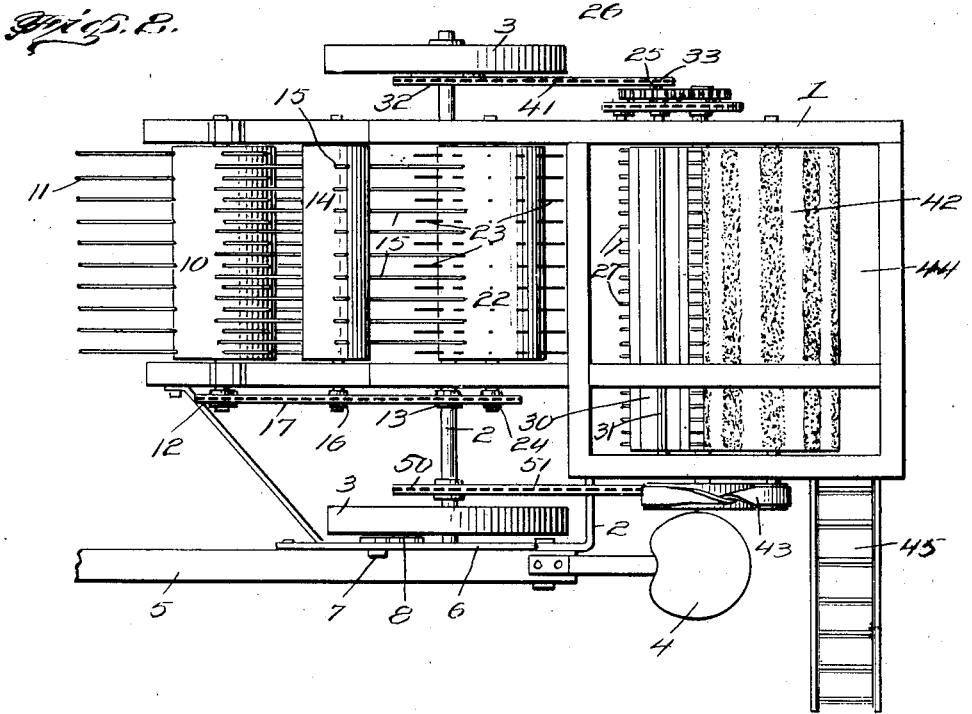
Figure 2 is a top plan view of the cotton harvester.
Figure 4:
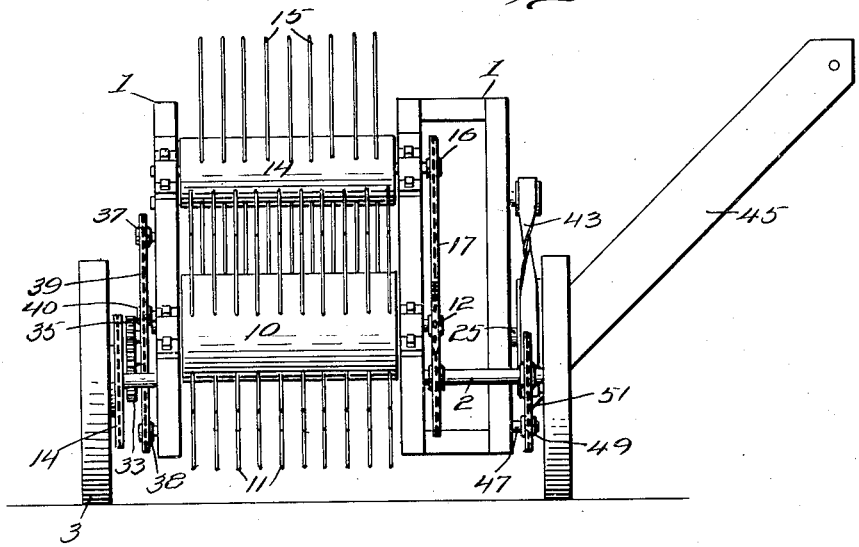
Figure 4 is a front end elevation of the cotton harvester.
Figure 5:
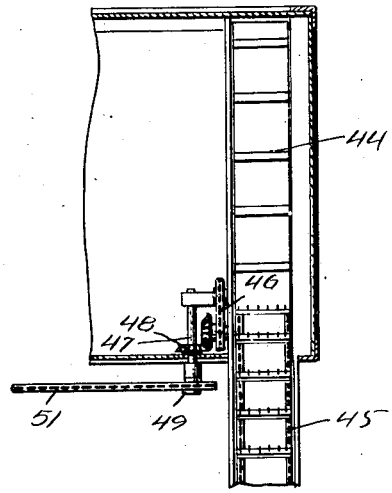
Figure 5 is a fragmentary horizontal sectional view, through the rear portion of the cotton harvester.

The cotton harvester comprises a frame 1, which is mounted upon a transversely disposed axle shaft 2, the said shaft being mounted upon ground engaging wheels 3, in a usual manner. An operator's seat 4 is mounted upon the frame 1. A tongue 5 is pivotally connected, at its rear end, with the frame 1. A lever 6 is pivoted at one end, upon the intermediate portion of the tongue, and a link 7 is pivoted at one end to the intermediate portion of the lever and pivoted at its other end to the frame 1. A rack segment 8 is mounted upon the frame 1 and the lever 6 is provided with the dog 9, which may engage the teeth of the rack segment 8 and whereby the lever is held at an adjusted position with relation to the rack segment and frame. It is apparent that by shifting the lever 6, the frame 1 may be tilted or inclined upon the axle shaft, and with relation to a horizontal line, in order that the means, parts and features, hereinafter to be described, may be properly positioned and disposed with relation to the cotton plant, from which the cotton bolls are removed.

A drum 10 is journalled for rotation at the forward portion of the frame 1, and longitudinally curved fingers 11 are mounted upon the said drum. The said fingers are preferably arranged in rows disposed longitudinally of the drum, and the rows of fingers are spaced at regular intervals. The shaft of the drum 10 is provided with a sprocket wheel 12, which is aligned with a sprocket wheel 13 mounted upon the axle shaft 2. A drum 14 is journalled upon the frame 1 at a point above the drum 10, and slightly behind the said drum 10. Several sets of longitudinally curved fingers 15 are mounted upon the drum 14, the said fingers 15 being arranged in rows disposed longitudinally of the said drum 14, and spaced at regular intervals. The fingers 15 are adapted to move between the fingers 11 as the drums 10 and 14 rotate. A sprocket wheel 16 is mounted upon the shaft of the drum 14 and is aligned with the wheels 12 and 13. A sprocket chain 17 is trained around the sprocket wheels 13, 12 and 16, and around a sprocket wheel 18 which may be adjusted upon the frame 1, for the purpose of taking up the slack in the chain 17, in a usual manner. A plate 19 is mounted upon the frame 1, and the forward portion is disposed between the drums 10 and 14. The forward portion of the plate 19 is provided with suitable slots, through which the teeth 11 and 15 of the drums 10 and 14 respectively may pass, as the said drum rotates. The intermediate portion of the plate 19 is downwardly and rearwardly inclined, and connects with a horizontally disposed plate 20, having upstanding teeth 21 mounted upon the upper side thereof. A drum 22 is journalled upon the frame 1, above the plate 20, and is provided at its periphery with a series of radially disposed teeth 23. The teeth 23 are arranged in rows, disposed longitudinally of the drum and located at regular intervals apart. A sprocket wheel 24 is mounted upon the shaft of the drum 23, and the sprocket chain 17, hereinbefore described, is trained around the sprocket wheel 24.

As the machine is moved along a row of standing plants, the axle shaft 2 is rotated, and the sprocket wheel 13 rotates with the said shaft. Therefore the chain 17, is moved in an orbit whereby the drums 10 and 14 are rotated, the forward portion of the drum 10 moving in an upward direction and the forward portion of the drum 14, in a downward direction, thus the teeth carried by the drum move in opposite directions. The teeth 11 upon the drum 10 encounter the cotton bolls upon the plants and remove the said bolls from the stems of the plants and carry them in an upward direction. The teeth 15 engage the bolls which are being moved upwardly by the teeth 11, and sweep the said bolls from the teeth and pass them along the inclined plate 19, and from the said plate 19, the bolls descend upon the plate 20. At the same time, the drum 22 is rotating by reason of the engagement of the chain 17 with the wheel 24 and the forward portion of the drum 23 moves in a downward direction. Therefore the bolls of cotton are encountered by the radially disposed teeth 23, and the said bolls are moved rearwardly through the spaces between the pins 21 and over the plate 20. As the bolls move between the pins 21, the hulls encounter the pin and are cracked or broken. The fragments of the hull follow the lint rearwardly, and are subsequently separated from the lint, as will be hereinafter explained.

A saw shaft 25 is journalled transversely upon the frame 1, and at a point spaced behind the plate 20. The trough 26 is connected at the forward edge with the rear edge of the plate 20, and is disposed downwardly and rearwardly under the shaft 25. A series of spaced saws 27 is mounted upon the shaft 25. A drum 28 is journalled upon the frame 1 and is disposed in the lower portion of the trough 26 and spaced from the bottom and rear edge thereof. The drum 28 is provided upon its periphery with spaced teeth 29, which are radially disposed. A drum 30 is journalled in the frame 1, at a point above the saws 27 and is provided upon its periphery with longitudinally disposed spaced ribs 31. A sprocket wheel 32 is mounted upon the axle shaft 2 and is aligned with a sprocket wheel 33 journalled at the side of the frame 1. The sprocket wheel 33 is fixed to a gear wheel 34, which meshes with the teeth of the gear wheel 35, mounted upon the shaft 25. A sprocket wheel 36 is fixed with relation to the shaft 25 and the gear wheel 35, and is aligned with sprocket wheels 37 and 38 mounted upon the shafts of the drum 30, and 28, respectively. A sprocket chain 39 is trained around the sprocket wheels 36, 37, and 38, and around an idle sprocket wheel 40 journalled at the side of the frame 1, and which may be shifted to take up the slack in the chain 37, in a usual manner. A sprocket chain 41 is trained around the sprocket wheels 32 and 33.

As the axle shaft 2 rotates, rotary movement is transmitted by the sprocket chain 41, the sprocket chain 33, the intermeshing gear wheels 34 and 35 to the saw shaft 25; thus the saws 27 are rotated, and the forward portions of the saws moved in an upward direction, and above the lower portion of the trough 26. At the same time, the chain 39 is moved in an orbit by the sprocket wheel 36 and the drums 28 and 30 are rotated, so that their forward portions move in an upward direction. As the cotton fiber and the particles of hulls are encountered by the pins 29, this material is carried in an upward direction, and the cotton fiber is impaled upon the teeth of the saws 27 and carried up toward the drum 30. The particles of hulls which have been broken from the cotton bolls, are carried rearwardly by the pins 29 and passed over the lower rear edge of the trough 26 and fall upon the ground. As the cotton fiber or bolls pass under the drum 30, the ribs 31 beat upon the said fiber or bolls and knock any particles of the hulls which may be adhering to the fiber from the fiber, and these particles fall back into the trough 26, and are again operated upon, in a manner as hereinbefore described, and are cast from the trough inasmuch as they have been loosened or separated from the cotton fiber.

A doffing brush 42 is journalled in the upper rear portion of the frame 1, at a point behind the drum 30 and above the gang of saws 27, and the cotton fiber which adheres to the teeth of the saws and which is carried rearwardly behind the drum 30 by the teeth of the saws is encountered by the bristles of the brush 32 and removed from the teeth of the saws and pass into the lower rear portion of the frame 1 of the machine. The shaft of the brush 42 is operatively connected with the shaft 25 by means of a belt 43, in a usual manner. A transversely moving belt 44 is mounted in the lower rear portion of the frame 1, and the cotton is deposited upon the upper run of the said belt. An elevator belt 45 is mounted at the lower rear portion of the frame 1, and at the delivery end of the belt 44, and aligned therewith. The belts 44 and 45 are operatively connected together, by means of a sprocket chain 46, trained around sprocket wheels mounted upon the end rollers or shafts of the respective belts, so that the upper runs of the belts 44 and 45 move in the same direction. A shaft 47 is operatively connected by means of intermeshing pinions 48, with the lower shaft of the elevator structure of which the belt 45 is a component part, and a sprocket wheel 49 is mounted upon the shaft 47. A sprocket wheel 50 is mounted upon the axle shaft 2, and is aligned with the sprocket wheel 49. A sprocket chain 51 is trained around the sprocket wheels 50 and 49, and is adapted to transmit rotary movement from the axle shaft to the shaft 47. The cotton lint or fiber which is deposited upon the upper run of the belt 44 as hereinbefore described is moved toward the belt 45 and delivered under the lower run of the belt and carried up along the elevator, by this means carrying the cotton over a screen in the bottom of elevator, this operation is to separate the small particles of trash from the cotton.

What is claimed is:

In a cotton harvester, means for receiving the cotton and breaking the hulls, means for separating the cotton from the hulls and for elevating the cotton, a gang of saws journaled for rotation above and to the rear of the last mentioned means and adapted to receive the cotton, a drum journaled above the gang of saws and forwardly of the axis of the saws, and having a series of longitudinally disposed ribs adapted to break the fragments of the hulls which adhere to the cotton and a doffing rotary member above and to the rear of the gang of saws for doffing the cotton from the saws.

In testimony whereof, I affix my signature.

ROBERT BRUTON.